July 6, 1965     A. G. LAUTZENHISER     3,193,784
VERTICAL SENSING UNIT
Filed July 13, 1961                                    2 Sheets-Sheet 1
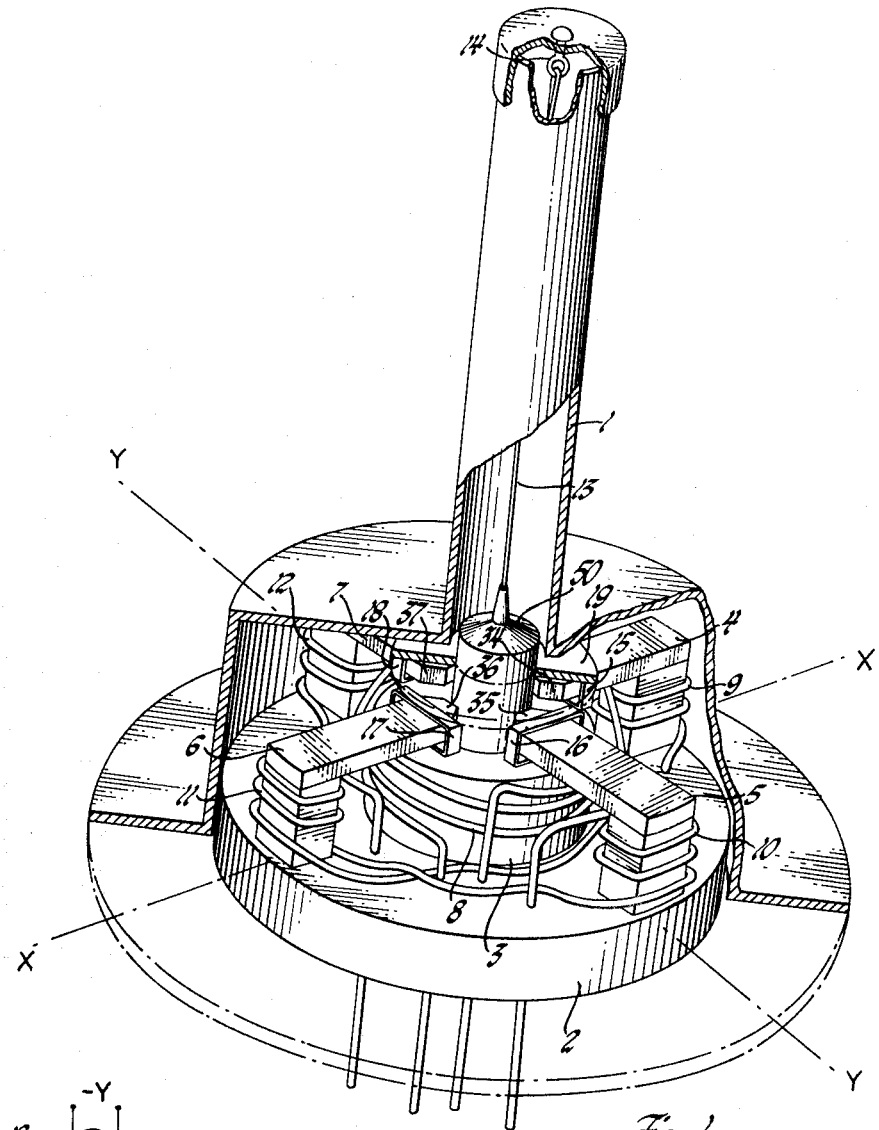
INVENTOR.
Argyle G. Lautzenhiser
BY
Paul J. Ethington
ATTORNEY July 6, 1965   A. G. LAUTZENHISER   3,193,784
VERTICAL SENSING UNIT Filed July 13, 1961   2 Sheets-Sheet 2

INVENTOR.
Argyle G. Lautzenhiser
BY
Paul J. Ethington
ATTORNEY

United States Patent Office 3,193,784
Patented July 6, 1965

3,193,784
VERTICAL SENSING UNIT
Argyle G. Lautzenhiser, Essex, Mass., assignor to General Motors Corporation, Detroit, Mich., a corporation of Delaware
Filed July 13, 1961, Ser. No. 123,711
7 Claims. (Cl. 336—30)

This invention relates to displacement sensing devices and more particularly to an improvement thereof in which unwanted reaction torques are minimized.

One form of a conventional displacement sensing device may comprise a magnetic armature mounted for relative movement with respect to a magnetic core pick-off having a pair of oppositely disposed poles for each axis of armature movement. Each pole may have an excitation coil energized by an A.C. source and an output coil with the output coils on the opposite poles being connected in series opposition. When the magnetic armature is centered with respect to the poles, the voltage induced in the output coils will be equal and hence cancel each other out. However, a displacement of the armature toward one of the poles will result in unequal flux paths such that the resultant of the voltages induced in the coil on the pole nearest the armature and in the coil on the pole opposite therefrom is proportional to the displacement of the armature from its null position. The displacement sensing devices which operate as described are subject to unwanted reaction torques imposed on the magnetic armature by the magnetic field linking the output coils.

It has been proposed to minimize such disturbing reactions in displacement sensing devices by utilizing non-magnetic armatures having sensing coils embedded therein. Displacements of the armature result in variations in the flux linking the sensing coils and thus a resultant output may be derived which is proportional to the relative displacement of the armature. Displacement sensing units as described necessitate the use of several leads attached to the sensing coils and thus may result in anisotropic forces. In addition thereto, if there is an appreciable amount of loading on the sensing coils, then such displacement sensing units would be subject to undesirable reaction torques.

In accordance with the present invention, a displacement sensing unit is provided in which magnetically induced reaction torques are eliminated without the use of output windings on the armature. The displacement sensing unit comprises a non-magnetic armature mounted for relative movement with respect to a magnetic core having a plurality of mutually spaced poles. An excitation winding on the core is coupled with output windings on the poles and non-magnetic shorting coils, opposite respective poles and carried by the armature. Displacements of the armature result in variations of the flux linking the shorting coils and resultant voltages may be obtained from the output coils which are related to the magnitude and direction of the displacements. Inasmuch as the armature and shorting coils are non-magnetic, unwanted reaction torques imposed upon the armature are minimized.

A more complete understanding of the invention may be had from the detailed description which follows taken with the accompanying drawings in which:

FIGURE 1 is a perspective view of a displacement sensing unit embodying the invention.

FIGURE 2 is a plan view of a diagrammatic representation of the displacement sensing unit.

Figure 3:
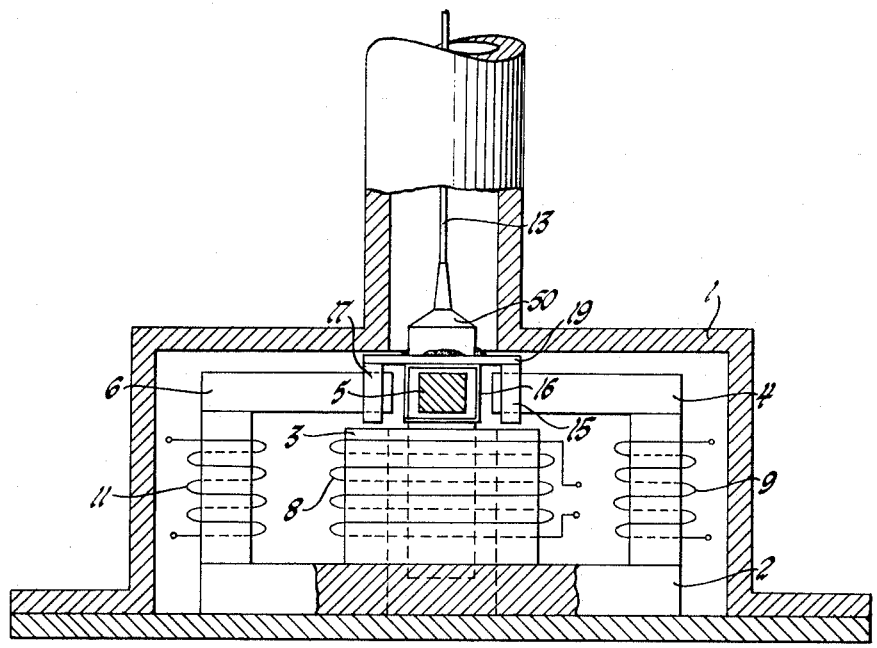
FIGURE 3 is an elevation view partially in section.

Referring to the drawings and particularly to FIGURES 1, 2 and 3, there is shown an illustrative embodiment of the invention in the form of a vertical sensing unit. A substantially bell-shaped housing 1 has mounted therein a magnetic core 2 which comprises a center pole 3 and four L-shaped outer poles 4, 5, 6 and 7 disposed in quadrature and coaxial with the center pole 3. The pole pieces 34, 35, 36 and 37 of outer poles 4, 5, 6 and 7, respectively, are tapered. An excitation coil 8 is disposed about the center pole 3. Output coils 9, 10, 11 and 12 are provided on the outer poles 4, 5, 6 and 7, respectively. A non-magnetic armature or bob 50 is pendulously supported by a wire 13 from an eye hook 14 such that the bob 50 is permitted pendulous movement relative to the outer poles 4, 5, 6 and 7. Four non-magnetic shorting coils 15, 16, 17 and 18 disposed in quadrature are mounted on the bob 50 by means of a non-magnetic flange 19. The shorting coils 15, 16, 17 and 18 are aligned with and embrace a portion of the outer poles 4, 5, 6 and 7, respectively, i.e., the non-magnetic shorting coil 15 is associated with and embraces a portion of the pole 4. The core 2 together with the center core 3, the outer poles 4, 5, 6 and 7, and the air gaps between the latter and the former, define magnetic circuits. The tapered pole pieces 34, 35, 36 and 37 permit gradual variations in flux linkages between the shorting coils and the magnetic circuits with relative motions therebetween.

Figure 4:
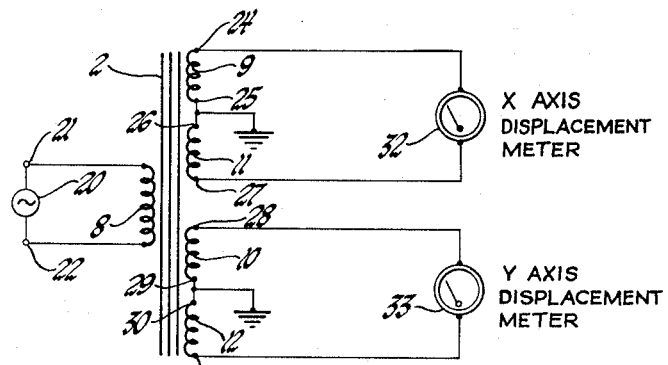
FIGURE 4 is a schematic diagram showing the electrical connections of the unit.

The excitation coil 8 is energized by an A.C. source 20 applied across its terminals 21 and 22 (FIGURE 4) to thus generate flux in the core 2. The output windings on the opposite poles of the outer poles 4, 5, 6 and 7 are connected in series opposition, i.e., coils 9 and 11 have their respective terminals 25 and 26 electrically connected together and thence to ground, and windings 10 and 12 have their respective terminals 29 and 30 electrically connected together and thence to ground. Across the output terminals 24 and 27 of the coils 9 and 11, respectively, and across the output terminals 28 and 31 of the coils 10 and 12, respectively, are connected X and Y axes displacement meters 32 and 33, respectively, for determining the X axis and Y axis components of the displacement of bob 50 from its null position, the operation of which will be described hereinafter.

In its null position, the bob 50 is centered relative to the outer poles 4, 5, 6 and 7 and thus the non-magnetic shorting coils 15, 16, 17 and 18 embrace equal portions of the outer poles. The flux flowing through the opposing outer poles are equal, and thus the voltages induced in output coils 9, 10, 11 and 12 are equal in phase and magnitude. Inasmuch as the output coils on the opposite poles are connected in series opposition the induced voltages are cancelled out, thus providing a null signal.

When the bob 50 is displaced from its null position toward one of the outer poles 4, 5, 6 and 7, there will result unequal flux linkages of the shorting coils with the magnetic circuits. The voltages induced in the coils on the opposite poles will not be equal and thus a resultant voltage will be obtained from the output terminals of the in series opposition connected coils. The unequal flux linkages of the shorting coils with the magnetic circuits result from the movements of the non-magnetic shorting coils 15, 16, 17 and 18 with the bob 50 such to embrace more or less of outer poles 4, 5, 6 and 7, respectively, depending upon the direction and amount of displacement of the bob 50. For example, if the bob 50 is caused to move toward the right in FIGURE 3, the shorting coil 15 will embrace more of the pole 4 and cover more of the air gap between the pole 4 and the center pole 3 thus more current is induced in the shorting coil 15 and the flux flowing through the pole 4 is decreased. The shorting coil 17 is moved to embrace less of the pole 6 and thus the current induced in the coil 17 has decreased with a resulting increase in the flux flowing through the pole 6. Thus the voltage induced in the coil 9 has decreased in magnitude and caused to lag in time phase that voltage induced in the coil 11. Inasmuch as the output coils 9 and 11 are connected in series opposition at their terminals 25 and 26 (FIGURE 4), an output taken across terminals 24 and 27 will have a phase indicative of the direction of displacement and a magnitude indicative of the amount of displacement of bob 50. The output can be read directly with a displacement meter 32. Inasmuch as the shorting coils as well as the flange 19 and the bob 50 are made of non-magnetic material, there will not be an appreciable resultant disturbing torque exerted on the bob 50 by the magnetic field linking the output windings tending to displace bob 50 from vertical.

Although the description of this invention has been given with respect to a particular embodiment it is not to be construed in a limiting sense. Numerous variations and modifications within the spirit and scope of the invention will now occur to those skilled in the art. For a definition of the invention reference is made to the appended claims.

I claim:

1. A displacement sensing unit comprising a magnetic core having at least a pair of spaced poles, the poles of each pair of poles being opposite each other, means to excite the core to generate an alternating flux therein, an output coil disposed on each of the poles, a non-magnetic armature mounted for movement relative to the core, a plurality of non-magnetic shorting coils mounted on the armature and so arranged that each shorting coil is associated with one of the poles in such a manner that as the armature is caused to move toward one of the poles the associated shorting coil embraces more of the pole, and utilization means connected to the output coils and being responsive to the voltage induced therein as a measure of the direction and amount of displacement of the armature.

2. A displacement sensing unit comprising a magnetic core having at least a pair of spaced poles, the poles of each pair of poles being opposite each other, means to excite the core to generate an alternating flux therein, an output coil disposed on each of the poles, the coils on the opposite poles being connected in series opposition, a non-magnetic armature mounted for movement relative to the core, a plurality of non-magnetic shorting coils mounted on the armature and so arranged that each shorting coil is associated with one of the poles in such a manner that as the armature is caused to move toward one of the poles the associated shorting coil embraces more of the pole, the poles having tapered pole pieces permitting gradual variations in flux linkages between the shorting coils and the poles with relative motion therebetween, and utilization means connected to the output coils and being responsive to the voltage induced therein as a measure of the direction and amount of displacement of the armature.

3. A vertical sensing unit comprising a magnetic core having a center pole and a plurality of mutually spaced pairs of outer poles coaxial with the center pole, the poles of each pair of outer poles being opposite each other, means to excite the center pole to generate an alternating flux in the core, an output coil disposed on each of the outer poles, the coils on opposite poles being connected in series opposition, a non-magnetic bob pendulously mounted for movement relative to the core, a plurality of non-magnetic shorting coils mounted on the bob, each shorting coil being associated with one of the outer poles in such a manner that as the bob is caused to move toward one of the outer poles the associated shorting coil embraces more of the pole, and utilization means connected to the output coils and being responsive to the voltage induced therein as a measure of the direction and amount of displacement of the bob.

4. A vertical sensing unit comprising a magnetic core having a center pole and a plurality of mutually spaced pairs of outer poles coaxial with the center pole, the poles of each pair of outer poles being opposite each other, means to excite the center pole to generate an alternating flux in the core, an output coil disposed on each of the outer poles, the coils on opposite poles being connected in series opposition, a non-magnetic bob pendulously mounted for movement relative to the core, a plurality of non-magnetic shorting coils mounted on the bob, each shorting coil being associated with one of the outer poles in such a manner that as the bob is caused to move toward one of the outer poles the associated shorting coil embraces more of the pole, the outer poles having tapered pole pieces permitting gradual variations in flux linkages between the shorting coils and the outer poles with relative motion therebetween, and utilization means connected to the output coils and being responsive to the voltage induced therein as a measure of the direction and amount of displacement of the bob from vertical.

5. A vertical sensing unit comprising a magnetic core having a center pole and four equally spaced outer poles disposed coaxially of the center pole, means to excite the center pole to generate alternating flux in the core, an output coil disposed on each of the outer poles, a non-magnetic bob pendulously mounted for movement relative to the core, four non-magnetic shorting coils disposed in quadrature mounted on the bob such that each shorting coil moves with the bob to embrace a portion of one of the outer poles, and utilization means connected to the output coils and being responsive to the voltage induced therein as a measure of the direction and amount of displacement of the bob from vertical.

6. A vertical sensing unit comprising a magnetic core having first and second pairs of outer poles disposed in quadrature and including a coaxial center pole, the first and second pairs of poles defining first and second input axes, respectively, means to excite the center pole to generate an alternating flux in the core, a first pair of output coils disposed respectively on the first pair of poles and being connected in series opposition, a second pair of output coils disposed respectively on the second pair of poles and being connected in series opposition, a non-magnetic bob pendulously mounted in alignment with the center pole and disposed intermediate the first and second pairs of poles, first and second pairs of non-magnetic shorting coils mounted on the bob, each shorting coil being aligned with a different outer pole and surrounding a part thereof in spaced relation whereby the bob is free to move relative to the core with components of motion along both input axes thereby causing each of the shorting coils to surround more or less of the corresponding pole, and first and second utilization means connected across the first and second pairs of output coils, respectively, and being responsive to the voltage induced therein as a measure of the displacement of the bob from vertical along the first and second input axes, respectively.

7. A vertical sensing unit comprising a magnetic core having first and second pairs of outer poles disposed in quadrature and including a coaxial center pole, the first and second pairs of poles defining first and second input axes, respectively, means to excite the center pole to generate an alternating flux in the core, a first pair of output coils disposed respectively on the first pair of poles and being connected in series opposition, a second pair of output coils disposed respectively on the second pair of poles and being connected in series opposition, a non-magnetic bob pendulously mounted in alignment with the center pole and disposed intermediate the first and second pairs of poles, first and second pairs of non-magnetic shorting coils mounted on the bob, each shorting coil being aligned with a different outer pole and surrounding a part thereof in spaced relation whereby the bob is free to move relative to the core with components of motion along both input axes thereby causing each of the shorting coils to surround more or less of the corresponding pole, the outer poles having tapered pole pieces permitting gradual variations in flux linkages between the shorting coils and the outer poles with relative motion therebetween, and first and second utilization means connected across the first and second pairs of output coils, respectively, and being responsive to the voltage induced therein as a measure of the displacement of the bob from vertical along the first and second input axes, respectively.

References Cited by the Examiner

UNITED STATES PATENTS

| | | | |
|---|---|---|---|
| 1,988,458 | 1/35 | Minorsky | 336—30 X |
| 2,417,188 | 3/47 | Clark | 336—79 |
| 2,427,872 | 9/47 | Newman | 336—136 X |
| 2,583,941 | 1/52 | Gordon | 336—30 |
| 2,774,057 | 12/56 | Jones | 336—135 X |
| 2,864,066 | 12/58 | Egbert et al. | 336—30 X |
| 3,023,626 | 3/62 | Bonnell | 336—30 X |

LARAMIE E. ASKIN, *Primary Examiner.*

JOHN F. BURNS, *Examiner.*